UNITED STATES PATENT OFFICE.

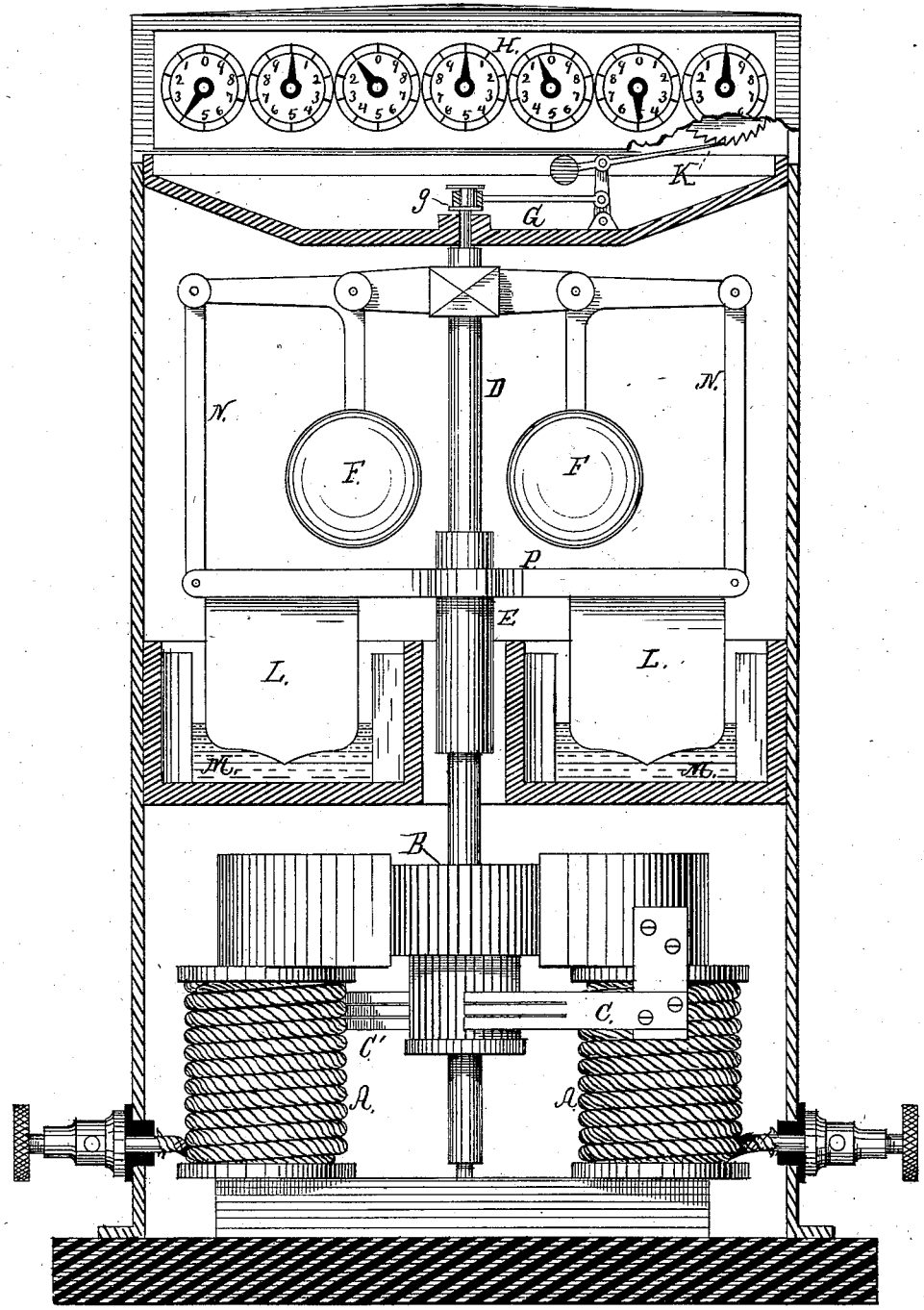

HIRAM S. MAXIM, OF BROOKLYN, ASSIGNOR TO THE UNITED STATES ELECTRIC LIGHTING COMPANY, OF NEW YORK, N. Y.

ELECTRICAL METER.

SPECIFICATION forming part of Letters Patent No. 255,308, dated March 21, 1882.

Application filed August 10, 1881. (No model.)

*To all whom it may concern:*

Be it known that I, HIRAM S. MAXIM, of Brooklyn, in the county of Kings and State of New York, have invented certain new and useful Improvements in Electrical Meters, of which the following is a specification.

The object of my invention is to obtain an accurate record of the amount of current that has passed over any given conductor, mainly with a view to ascertaining the amount of current supplied in a system of general electrical distribution to any given group of electric lamps, motors, or other devices for converting and utilizing the same, and for this purpose I have devised a meter capable of being operated by the current in a main or branch conductor, and which is so constructed as to record a number of units of a predetermined scale, which shall indicate correctly the amount of current that has passed over the conductor with which said meter is connected. The device for accomplishing this result consists mainly of an electro-magnetic motor, a retarding device calibrated so as to produce in the said motor a speed proportionate to the strength of current energizing it, and a registering apparatus connected with and driven by the motor, for the purpose of recording the number of revolutions made or work done.
In the accompanying drawing a meter of this description constructed in accordance with my invention is shown.

A A are the field-magnets of an ordinary motor, wound with a few turns of coarse wire that forms a part of the main conductor leading to the lights or other electrical devices designed to utilize the current which is to be measured.

B is an armature, the coils of which are composed of fine wire included in a branch or derived circuit from the main conductor.

C C are the commutators; D, the motor shaft; and G, a rod connected to shaft D by an eccentric, $g$, and adapted to impart an oscillatory movement to a lever, K, provided with a gravity-pawl. The construction of these parts is such that for every revolution of the shaft D the first wheel of register H is moved one space.
F F are governor-balls rotated by shaft D, so that as the speed of the latter increases they are thrown outward by centrifugal force. The governor-balls F are freely suspended and so balanced that the least variation in speed of the motor-shaft D will cause a corresponding change in the position of their path of rotation. The balls connect by a system of levers, N, with a bar, P, that is joined to a sleeve, E, on shaft D. L L are two fans or blades of light material, which are carried by the rotation of motor-shaft D around in a trough-like receptacle, M, containing a heavy liquid, such as oil or glycerine.

Let us suppose, now, for the sake of illustrating the principle of this invention, that the degree of immersion of the fans was constant for all speeds of the motor. It is clear in this case, since the resistance to the revolution of the fans is directly proportionate to the square of their velocity, that for every increase in the amount of current impelling the motor far too great a load would be imposed upon it, or, in other words, one that would increase with its speed, and that not in direct proportion. It is evident, therefore, that a meter thus constructed could not be relied on as giving a correct record of work done or current expended. In order, therefore, to adjust the retarding force of the fans or to calibrate it, so to speak, governor-balls are employed in connection with the fans to vary their degree of immersion. This would to a certain extent remedy the difficulties in the way of obtaining an accurate record, but not entirely, as many variable factors have still to be taken into consideration. For this reason I give to the fans a certain shape determined by experiment, as follows: The lower ends of the fans are cut tapering, and their position relatively to the level of the liquid is so adjusted that only their points, say, will be immersed when the motor is driven at the highest speed at which it is calculated to run. Let a definite reduction in current strength be made. This should be attended by a corresponding reduction of speed. It will be found, however, that the speed is too slow, showing that the load on the motor is still too great. This is remedied by cutting away strips from the portions of the fans that have been brought under the surface of the liquid by the reduction in current strength until the speed runs up to the desired limit.

The same operation is repeated for a number of reductions in current strength sufficient to fix the curve necessary to give to the fans.

In this manner—that is to say, by the employment of the governor-balls in conjunction with fans formed as described—I obtain a retarding device which is calibrated so as to cause the motor to revolve at a speed proportionate to the strength of the current energizing it.

I design making the meters with all their parts interchangeable, so that any number may be constructed from one used as a standard, and which has been calibrated by a series of experimental tests similar to those above described.

Having thus described my invention, what I claim as new, and desire to secure by Letters Patent, is—

1. The combination, with an electro-magnetic motor and registering mechanism, of retarding mechanism calibrated to cause the motor to revolve at a speed proportionate to the strength of the current energizing it, substantially as hereinbefore set forth.

2. The combination of an electro-magnetic motor, fans or blades driven thereby, a receptacle containing a liquid in which the fans are caused to revolve, mechanism, as described, for controlling the degree of immersion of the said fans or blades, and a registering apparatus, substantially as set forth.

3. The combination of an electro-magnetic motor, fans or blades driven thereby, a receptacle containing liquid, a centrifugal governor suitably connected with the said fans and adapted to control their degree of immersion in the liquid, and a registering apparatus, substantially as described.

4. The combination, with an electro-magnetic motor, of fans or blades L-shaped, as described, a system of levers, N, connecting the fans with a centrifugal governor, a tank or receptacle, M, containing liquid, and a registering apparatus, these parts being connected and arranged for operation substantially in the manner specified.

In testimony whereof I have hereunto set my hand this 5th day of August, 1881.

HIRAM S. MAXIM.

Witnesses:
PARKER W. PAGE,
CLAYTON KNEELAND.